United States Patent
Wu et al.

(10) Patent No.: US 12,337,706 B2
(45) Date of Patent: Jun. 24, 2025

(54) PURE ELECTRIC AVAILABLE POWER DETERMINATION METHOD AND SYSTEM, AND VEHICLE

(71) Applicant: GREAT WALL MOTOR COMPANY LIMITED, Baoding (CN)

(72) Inventors: Maiqing Wu, Baoding (CN); Shengbo Wang, Baoding (CN); Lei Li, Baoding (CN); Zhiwei Liu, Baoding (CN); Yang Hao, Baoding (CN); Gengnan Zhang, Baoding (CN); Linxiao Wang, Baoding (CN); Yazhou Shen, Baoding (CN); Mingwang Zhou, Baoding (CN); Yanlong Geng, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 429 days.

(21) Appl. No.: 17/915,674

(22) PCT Filed: Apr. 9, 2021

(86) PCT No.: PCT/CN2021/086223
§ 371 (c)(1),
(2) Date: Sep. 29, 2022

(87) PCT Pub. No.: WO2021/204262
PCT Pub. Date: Oct. 14, 2021

(65) Prior Publication Data
US 2023/0139991 A1    May 4, 2023

(30) Foreign Application Priority Data
Apr. 10, 2020    (CN) .......................... 202010281158.6

(51) Int. Cl.
*B60L 50/71*    (2019.01)
*B60L 50/75*    (2019.01)
(Continued)

(52) U.S. Cl.
CPC ............... *B60L 50/71* (2019.02); *B60L 50/75* (2019.02); *B60L 58/31* (2019.02); *B60L 58/40* (2019.02);
(Continued)

(58) Field of Classification Search
CPC .......... B60L 50/71; B60L 50/75; B60L 58/31; B60L 58/40; B60L 2240/421;
(Continued)

(56) References Cited

U.S. PATENT DOCUMENTS 6,847,127 B1 *    1/2005    Lee ..................... B60L 58/34
                                                        290/40 C
8,689,618 B2 *    4/2014    Engstrom ......... G01M 17/0074
                                                        73/116.05
(Continued)

FOREIGN PATENT DOCUMENTS

CA    3009598 A1    6/2017
CN    100999191 A    7/2007
(Continued)

OTHER PUBLICATIONS

EP 21784976.9 Extende European search report dated Sep. 11, 2023.

*Primary Examiner* — Kito R Robinson
*Assistant Examiner* — Alexander V Gentile
(74) *Attorney, Agent, or Firm* — IPro, PLLC (57) ABSTRACT

The present disclosure provides a method and system for determining a pure electric available power and a vehicle, the method being applied to a vehicle including a fuel cell, the vehicle further including a battery pack and a motor, the fuel cell and the battery pack being electrically connected to the motor, wherein the method includes: monitoring a current travelling state of the vehicle and a current on-off state of the fuel cell; acquiring a maximum peak power outputted
(Continued)

```
┌─────────────────────────────────────────────────┐
│ monitoring a current travelling state of        │  S100
│ the vehicle and a current on-off state of       │
│ the fuel cell                                    │
└─────────────────────────────────────────────────┘
                      │
                      ▼
┌─────────────────────────────────────────────────┐
│ acquiring a maximum peak power outputted by     │  S200
│ the electric machine, a maximum output power of │
│ the battery pack and a starting-up power of     │
│ the fuel cell                                    │
└─────────────────────────────────────────────────┘
                      │
                      ▼
┌─────────────────────────────────────────────────┐
│ according to the current travelling state, the  │  S300
│ current on-off state of the fuel cell, the      │
│ maximum peak power, the maximum output power    │
│ and the starting-up power, determining the      │
│ pure electric available power                    │
└─────────────────────────────────────────────────┘
``` by the motor, a maximum output power of the battery pack and a starting-up power of the fuel cell; and according to the current travelling state, the current on-off state of the fuel cell, the maximum peak power, the maximum output power and the starting-up power, determining the pure electric available power.

9 Claims, 3 Drawing Sheets

(51) Int. Cl.
    *B60L 58/31*     (2019.01)
    *B60L 58/40*     (2019.01)
    *B60L 15/20*     (2006.01)
    *B60L 58/30*     (2019.01)
    *H01M 16/00*     (2006.01)

(52) U.S. Cl.
    CPC ........... *B60L 15/20* (2013.01); *B60L 15/2045* (2013.01); *B60L 58/30* (2019.02); *B60L 2240/421* (2013.01); *B60L 2240/423* (2013.01); *H01M 16/006* (2013.01); *H01M 2220/20* (2013.01); *H01M 2250/20* (2013.01); *Y02E 60/50* (2013.01); *Y02T 10/70* (2013.01); *Y02T 10/72* (2013.01); *Y02T 90/40* (2013.01)

(58) Field of Classification Search
    CPC ........... B60L 2240/423; B60L 15/2045; B60L 58/30; B60L 15/20; B60L 2260/54; H01M 16/006; H01M 2220/20; H01M 2250/20; Y02E 60/50; Y02T 10/70; Y02T 10/72; Y02T 90/40

See application file for complete search history.

(56) References Cited

U.S. PATENT DOCUMENTS

| | | | |
|---|---|---|---|
| 2016/0362010 A1* | 12/2016 | Ham | B60L 1/006 |
| 2019/0160963 A1* | 5/2019 | Yoon | B60L 1/003 |
| 2023/0173950 A1* | 6/2023 | Wu | H01M 8/04925 |
| | | | 701/22 |

FOREIGN PATENT DOCUMENTS

| | | | | | |
|---|---|---|---|---|---|
| CN | 105083268 | A | | 11/2015 | |
| CN | 107472075 | A | | 12/2017 | |
| CN | 107719163 | A | * | 2/2018 | ............ B60L 58/10 |
| CN | 108556672 | A | | 9/2018 | |
| CN | 108790848 | A | | 11/2018 | |
| CN | 108819767 | A | | 11/2018 | |
| CN | 109823157 | A | * | 5/2019 | ............ Y02T 90/40 |
| CN | 110040038 | A | | 7/2019 | |
| CN | 110194065 | A | | 9/2019 | |
| CN | 110395144 | A | | 11/2019 | |
| CN | 110549876 | A | | 12/2019 | |
| CN | 110789403 | A | | 2/2020 | |
| CN | 111717077 | A | | 9/2020 | |
| JP | 2001266917 | A | | 9/2001 | |
| KR | 20040001776 | A | | 1/2004 | |

\* cited by examiner

FIG. 6

PURE ELECTRIC AVAILABLE POWER DETERMINATION METHOD AND SYSTEM, AND VEHICLE

CROSS REFERENCE TO RELEVANT APPLICATIONS

The present disclosure claims the priority of the Chinese patent application filed on Apr. 10, 2020 before the China Patent Office with the application number of 202010281158.6 and the title of "PURE ELECTRIC AVAILABLE POWER DETERMINATION METHOD AND SYSTEM, AND VEHICLE", which is incorporated herein in its entirety by reference.

TECHNICAL FIELD

The present disclosure relates to the technical field of new-energy vehicles and, more particularly, to a method and system for determining a pure electric available power and a vehicle.

BACKGROUND

Currently, with the increasingly serious global environmental problems, new-energy vehicles have been rapidly developed.

Fuel cell vehicles, as green environmental protection new-energy vehicles, use a battery pack and a fuel cell system as the power devices, and, by using a controlling system, enable the two power devices to actively cooperate and match, to realize an optimum energy allocation, thereby obtaining the dual effects of an optimum driving performance and an optimum economic efficiency with a low energy and a high efficiency.

In order to realize the above-described effects, it is required to firstly determine the available output power of the battery pack for the utilization to coordinating energy, and ensure reasonable controlling on the vehicle speed, controlling on the acceleration performance and controlling on the starting-up and shutting-down of the fuel cell system, to, on the precondition that the normal operation and work of the power systems of the entire vehicle should be ensured, satisfy the requirements by the driver on the power performance and the comfortableness of the vehicle.

However, the existing mode of determining the available output power of the battery pack requires complicated logical operations based on the transmission ratio of the gearbox and the rotational speed of the motor, and, because the rotational speed of the motor has a high deviation, the calculated power easily has a high deviation. Moreover, because, during the entire process of the travelling of the vehicle, energy recovery might happen at any time, if the available output power of the battery pack is displayed in a dashboard, the existing mode of determining the available power of the battery pack results in jumping of the available-power displaying pointer of the dashboard, which brings an adverse visual feeling of the user.

SUMMARY

In view of the above, the present disclosure provides a method and system for determining a pure electric available power and a vehicle, which solves the problem of the existing mode of determining the pure electric available power of fuel cell vehicles that complicated logical operations are required and the calculation result has a high deviation.

In order to achieve the above object, the technical solutions of the present disclosure are realized as follows:

A method for determining a pure electric available power, the method being applied to a vehicle including a fuel cell, the vehicle further including a battery pack and a motor, the fuel cell and the battery pack being electrically connected to the motor, wherein the method includes:
  monitoring a current travelling state of the vehicle and a current on-off state of the fuel cell;
  acquiring a maximum peak power outputted by the motor, a maximum output power of the battery pack and a starting-up power of the fuel cell; and
  according to the current travelling state, the current on-off state of the fuel cell, the maximum peak power, the maximum output power and the starting-up power, determining the pure electric available power.

Optionally, in the method for determining a pure electric available power, the starting-up power refers to a minimum output power of the fuel cell when driving the motor by using the fuel cell has a higher efficiency than an efficiency of driving the motor by using the battery pack.

Optionally, in the method for determining a pure electric available power, the current travelling state includes a current gear state of the vehicle and a current on-off state of an energy-recovery function.

Optionally, in the method for determining a pure electric available power, the step of, according to the current travelling state, the current on-off state of the fuel cell, the maximum peak power, the maximum output power and the starting-up power, determining the pure electric available power includes:
  when the current gear state of the vehicle is a non-travelling gear state, and/or the energy-recovery function is in an on-state, and/or the fuel cell is in an on-state, determining the pure electric available power to be 0; and
  when the current gear state of the vehicle is a travelling gear state, the energy-recovery function is in an off-state, and the fuel cell is in an off-state, then according to a smallest value among the maximum peak power, the maximum output power and the starting-up power, determining the pure electric available power.

Optionally, in the method for determining a pure electric available power, the step of acquiring the maximum peak power outputted by the motor includes:
  acquiring a maximum output torque of the motor and a current rotational speed of the motor; and
  according to the maximum output torque and the current rotational speed, determining the maximum peak power.

Another object of the embodiments of the present disclosure is to provide a system for determining a pure electric available power, the system being applied to a vehicle including a fuel cell, the vehicle further including a battery pack and a motor, the fuel cell and the battery pack being electrically connected to the motor, wherein the system includes:
  a monitoring module configured for monitoring a current travelling state of the vehicle and a current on-off state of the fuel cell;
  an acquiring module configured for acquiring a maximum peak power outputted by the motor, a maximum output power of the battery pack and a starting-up power of the fuel cell; and a determining module configured for, according to the current travelling state, the current on-off state of the fuel cell, the maximum peak power, the maximum output power and the starting-up power, determining the pure electric available power.

Optionally, in the system for determining a pure electric available power, the starting-up power refers to a minimum output power of the fuel cell when driving the motor by using the fuel cell has a higher efficiency than an efficiency of driving the motor by using the battery pack.

Optionally, in the system for determining a pure electric available power, the current travelling state includes a current gear state of the vehicle and a current on-off state of an energy-recovery function.

Optionally, in the system for determining a pure electric available power, the determining module includes:

a first determining unit configured for, when the current gear state of the vehicle is a non-travelling gear state, and/or the energy-recovery function is in an on-state, and/or the fuel cell is in an on-state, determining the pure electric available power to be 0; and a second determining unit configured for, when the current gear state of the vehicle is a travelling gear state, the energy-recovery function is in an off-state, and the fuel cell is in an off-state, then according to a smallest value among the maximum peak power, the maximum output power and the starting-up power, determining the pure electric available power.

Optionally, in the system for determining a pure electric available power, the acquiring module includes:

an acquiring unit configured for acquiring a maximum output torque of the motor and a current rotational speed of the motor; and a determining unit configured for, according to the maximum output torque and the current rotational speed, determining the maximum peak power.

Yet another object of the present disclosure is to provide a vehicle, the vehicle including a fuel cell, a battery pack and a motor, the fuel cell and the battery pack being electrically connected to the motor, wherein the vehicle further includes the system for determining a pure electric available power stated above.

As compared with the prior art, the method and system for determining a pure electric available power and the vehicle according to the present disclosure have the following advantages:

In the present disclosure, the current travelling state of the vehicle and the current on-off state of the fuel cell are monitored, and the maximum peak power outputted by the motor, the maximum output power of the battery pack and the starting-up power of the fuel cell are acquired; and, subsequently, according to the current travelling state, the current on-off state of the fuel cell, the maximum peak power, the maximum output power and the starting-up power, the pure electric available power is determined. The pure electric available power may be quickly determined by using merely the travelling state of the vehicle, the on-off state of the fuel cell, the maximum peak power of the motor, the maximum output power of the battery pack and the starting-up power of the fuel cell, without complicated logical operation, and the operation states of the vehicle, the fuel cell system, the motor and the battery pack are taken into consideration at a same time, whereby the determined pure electric available power is closer to the actual available power.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are embodiments of the present disclosure, and a person skilled in the art can obtain other figures according to these figures without paying creative work.

The drawings, which form part of the present disclosure, are intended to provide a further understanding of the present disclosure. The illustrative embodiments of the present disclosure and their explanation are intended to interpret the present disclosure, and do not inappropriately limit the present disclosure. In the drawings.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

The embodiments of the present application will be described in further detail below with reference to the drawings. Although the drawings illustrate the embodiments of the present application, it should be understood that the present application may be implemented in various forms, which should not be limited by the embodiments illustrated herein. In contrast, the purpose of providing those embodiments is to more clearly understand the present application, and to completely convey the scope of the present application to a person skilled in the art.

It should be noted that, subject to the avoiding of any conflict, the embodiments and the features of the embodiments of the present disclosure may be combined.

The present disclosure will be described in detail below with reference to the drawings and the embodiments.

Figure 1:
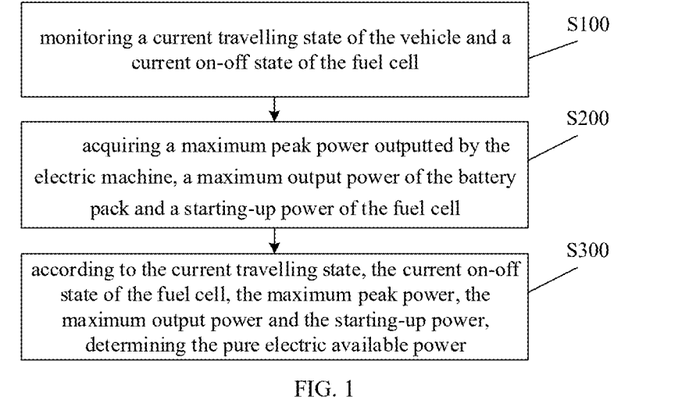
FIG. 1 is a schematic flow chart of the method for determining a pure electric available power according to an embodiment of the present disclosure.

Referring to FIG. 1, FIG. 1 shows a schematic flow chart of the method for determining a pure electric available power according to an embodiment of the present disclosure. The method for determining a pure electric available power according to the embodiment of the present disclosure is applied to a fuel cell vehicle, the vehicle further includes a battery pack and a motor, and the fuel cell and the battery pack are electrically connected to the motor, wherein the method includes the steps S100-S300.

In an embodiment of the present disclosure, the fuel cell and the battery pack are electrically connected to the motor; in other words, the fuel cell and the battery pack may supply energy to the motor, to drive the vehicle to travel. In practical applications, it is required to, determine that the motor is driven by the fuel cell and/or the battery pack to rotate according to the power demand, the travelling state and the energy-consumption economic efficiency of the vehicle, or, in other words, determine the particular allocation of the energy for driving the motor to operate between the fuel cell and the battery pack.

Step S100: monitoring a current travelling state of the vehicle and a current on-off state of the fuel cell.

In the step S100, because the power demands of the vehicle in different travelling states are different, correspondingly, the operation states of the batteries are also different, to deal with the power demands of the vehicle in the different travelling states. Therefore, it is required to monitor the current travelling state of the vehicle, which is used to determine the available power of the battery pack.

In the step S100, when the fuel cell has not been started up, the vehicle is driven completely by the battery pack, and the available power of the battery pack is determined jointly by the performance of the battery pack itself and the outputting performance of the motor.

However, when the fuel cell has been started up, because the energy-consumption economic efficiency of the battery pack is lower than that of the fuel cell, in order to realize a better energy-consumption economic efficiency, it is required to correspondingly adjust the available power of the battery pack. In other words, the on-off state of the fuel cell also influences the available power of the battery pack. Therefore, it is required to monitor the current on-off state of the fuel cell for determining the available power of the battery pack.

Step S200: acquiring a maximum peak power outputted by the motor, a maximum output power of the battery pack and a starting-up power of the fuel cell.

In the step S200, the maximum peak power outputted by the motor refers to the maximum output power that the motor can reach under the current rotational-speed condition, and the power also refers to the upper limit value of the power that the vehicle may practically output on the precondition that the output power of the battery pack is sufficient.

The maximum output power of the battery pack refers to the upper limit value of the power that the battery pack can output in the current state, and the maximum output power is decided by the electric quantity of the battery pack and the performance of the battery pack. The starting-up power of the fuel cell refers to the required power of the vehicle that triggers the fuel cell to start up.

Optionally, the starting-up power refers to a minimum output power of the fuel cell when driving the motor by using the fuel cell has a higher efficiency than an efficiency of driving the motor by using the battery pack. In other words, it is pre-configured that the fuel cell starts up merely under the vehicle power demand in which the energy-consumption economic efficiency of the fuel cell is higher than the energy-consumption economic efficiency of the battery pack, which can result in the optimum overall energy consumption of the vehicle.

Optionally, the maximum peak power outputted by the motor may be obtained by calculating by using the current rotational speed of the motor in combination with the external characteristic curve of the motor.

The external characteristic curve represents the correspondence relation between the output power and the output torque of the motor and the rotational speed. According to the external characteristic curve, the maximum output powers and the maximum output torques of the motor at different rotational speeds may be determined. In the external characteristic curve, with the increasing of the rotational speed of the motor, the output power of the motor gradually increases, while output torque of the motor maintains constant, at which point the driving motor is in a constant-torque state. The rotational speed increases to the rotational speed when the output power of the motor has reached its maximum power value, i.e., the inflection-point rotational speed. Subsequently, with the continuously increasing of the rotational speed, the output torque of the motor starts to decrease, while its output power maintains at the state of the maximum power value, at which point the motor is in a constant-power state.

In practical applications, the external characteristic curve is required to be determined in advance by testing, and, because of the difference in the performances of vehicles, different vehicles require being provided with different external characteristic curves.

Optionally, the maximum peak power outputted by the motor may be determined by using the current rotational speed of the motor and the maximum output torque in the above-described external characteristic curve. Particularly, the maximum peak power Pm outputted by the motor may be obtained by calculating by using the following formula: Pm=the maximum output torque of the motor×the current rotational speed of the motor/9550.

In practical applications, the maximum peak power Pm may be displayed in a vehicle dashboard, and the maximum output power of the vehicle may be added to be displayed, to exhibit the operation state of the motor more intuitively. Particularly, that may be exhibited in the manner of Pm=(the maximum output torque of the motor×the actual rotational speed of the motor/9550)/the maximum output power of the vehicle*100%. The maximum output power of the vehicle is a calibrated value (to be determined, TBD), and is determined by the overall performance of the vehicle.

In practical applications, the maximum output power of the vehicle, the maximum output power of the battery pack and the starting-up power of the fuel cell may be acquired by accessing an entire-vehicle controller, the battery pack and the fuel cell respectively via a Controller Area Network (CAN).

S300: according to the current travelling state, the current on-off state of the fuel cell, the maximum peak power, the maximum output power and the starting-up power, determining the pure electric available power.

In the step S300, by analyzing the current travelling state of the vehicle and the current on-state of the fuel cell, whether the battery pack can output a power is determined. And, when the battery pack may output a power, the maximum exportable power when merely the battery pack outputs electric energy, i.e., the pure electric available power, is determined from the maximum peak power, the maximum output power and the starting-up power. Moreover, when, by analyzing the current travelling state of the vehicle and the current on-off state of the fuel cell, it is determined that the battery pack cannot output a power, then the pure electric output power of the vehicle is 0.

As compared with the prior art, the method for determining a pure electric available power according to the present disclosure has the following advantages:

In the method, the current travelling state of the vehicle and the first on-off state of the fuel cell are monitored, and the maximum peak power outputted by the motor, the maximum output power of the battery pack and the starting-up power of the fuel cell are acquired; and, subsequently, according to the current travelling state, the current on-off state of the fuel cell, the maximum peak power, the maximum output power and the starting-up power, the pure electric available power is determined. The pure electric available power may be quickly determined by using merely the travelling state of the vehicle, the on-off state of the fuel cell, the maximum peak power of the motor, the maximum output power of the battery pack and the starting-up power of the fuel cell, without complicated logical operation, and the operation states of the vehicle, the fuel cell system, the motor and the battery pack are taken into consideration at a same time, whereby the determined pure electric available power is closer to the actual available power, which solves the problem of the existing mode of determining the pure electric available power of fuel cell vehicles that complicated logical operations are required and the calculation result has a high deviation.

Optionally, the vehicle according to the embodiments of the present disclosure is a vehicle that has the function of energy recovery. In other words, the motor may rotate by the driving by the battery pack and/or the fuel cell, to drive the vehicle to travel. At the same time, when the vehicle requires decelerating and braking, after electromagnetically converting part of the kinetic energy of the vehicle into electric energy, the motor may also charge the battery pack, to store the converted electric energy into the battery pack, thereby realizing the energy recovery. The battery pack is not only used to supply electric power to the motor and the other electricity consuming components of the vehicle, but is also used to store the electric energy generated when the motor performs energy recovery.

The process of the energy recovery refers to the process of, by using the motor, electromagnetically converting part of the kinetic energy when the vehicle brakes or decelerates into electric energy and storing it in the power battery, and generating a certain braking resistance on the motor at a same time, to be used for the deceleration and braking of the vehicle. The direction of the braking resistance is opposite to the rotation direction of the motor, and therefore it can enable the vehicle to brake or decelerate. From the process of the energy recovery, it can be seen that, when the vehicle is performing the energy recovery, the battery pack is not required to output a power.

Therefore, in an embodiment, when the fuel cell vehicle has the energy-recovery function, in the method for determining a pure electric available power according to the embodiments of the present disclosure, the current travelling state particularly includes the current gear state of the vehicle and the current on-off state of the energy-recovery function.

In the present embodiment, because the power demands of the vehicle in different gear states are different, correspondingly, the operation states of the batteries are also different, to deal with the power demands of the vehicle in the different gear states. Therefore, it is required to monitor the current gear state of the vehicle, which is used to determine the available power of the battery pack.

In the present embodiment, the current on-off state of the energy-recovery function includes two cases that the energy-recovery function is in the on-state and that the energy-recovery function is in the off-state. Because, when the energy-recovery function of the vehicle is in the on-state and in the off-state, the power demands of the vehicle are different, correspondingly, the operation states of the battery pack are also different, to deal with the power demands of the vehicle in the different states of the energy-recovery function. Therefore, it is required to monitor the current on-off state of the energy-recovery function of the vehicle, which is used to determine the available power of the battery pack.

Figure 6:
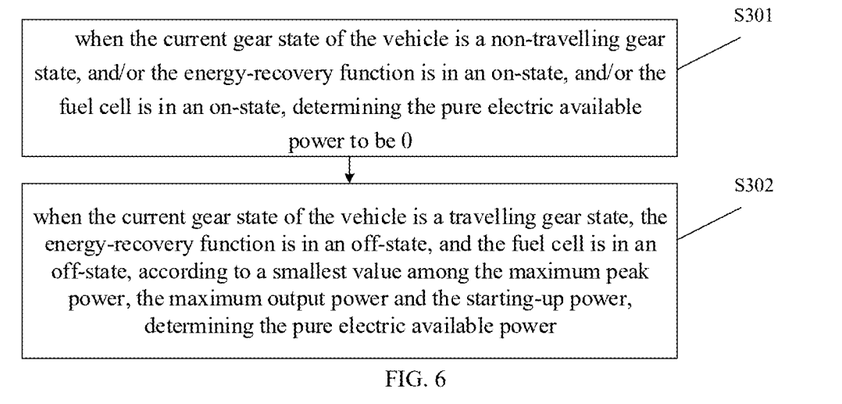
FIG. 6 is a schematic flow chart of the method for determining a pure electric available power according to an embodiment of the present disclosure.

Optionally, in an embodiment, in the method for determining a pure electric available power according to the embodiments of the present disclosure, referring to FIG. 6, the step S300 particularly includes the steps S301-S302:

S301: when the current gear state of the vehicle is a non-travelling gear state, and/or the energy-recovery function is in an on-state, and/or the fuel cell is in an on-state, determining the pure electric available power to be 0.

Because, when the vehicle is in a non-travelling gear state, the system determines by default that the vehicle does not have a power demand, it is determined that the output power of the battery pack is 0; in other words, the pure electric available power is 0. In practical applications, the non-travelling gear state is particularly expressed as the P gear or the N gear.

Because, when the energy-recovery function is in the on-state, the vehicle does not have a power demand, and the battery pack is required to store the electric energy generated by the energy recovery, it is determined that the output power of the battery pack is 0; in other words, the pure electric available power is 0. In practical applications, that the energy-recovery function is in the on-state includes a braking-energy-recovery-activation state and a sliding-energy-recovery-activation state. The sliding-energy-recovery-activation state refers to the state in which the vehicle is sliding and the accelerator pedal does not have a torque demand. The sliding-energy-recovery-activation state is triggered when the vehicle reaches the threshold of the vehicle speed, the brake pedal is not trodden and the wheel-side-driving-torque request from the accelerator pedal is less than −5 Nm. Preferably, the sliding-energy-recovery-activation state is triggered when the vehicle reaches the threshold of the vehicle speed and the accelerator pedal and the brake pedal are not trodden.

Because, when the fuel cell is in the on-state, the energy-consumption economic efficiency of the fuel cell is higher than the energy-consumption economic efficiency of the battery pack, in order to realize the optimum effect of the energy consumption of the vehicle, the vehicle is controlled to be driven completely by the fuel cell. Therefore, it is determined that the output power of the battery pack is 0; in other words, the pure electric available power is 0.

S302: when the current gear state of the vehicle is a travelling gear state, the energy-recovery function is in an off-state, and the fuel cell is in an off-state, according to a smallest value among the maximum peak power, the maximum output power and the starting-up power, determining the pure electric available power.

In the step S302, when the vehicle is in a travelling gear state, the vehicle has a power demand, and when the energy-recovery function of the vehicle has not been started, the battery pack may be used to output electric energy. Moreover, because the fuel cell has not been started up, the required power of the vehicle is provided completely by the battery pack. Therefore, when the current gear state of the vehicle is a travelling gear state, the energy-recovery function is in an off-state, and the fuel cell is in an off-state, the pure electric available power of the battery pack is limited and determined jointly by the performance of the motor, the performance of the battery pack and the performance of the fuel cell, which is similar to the Cannikin Law. Particularly, the pure electric available power of the battery pack is the minimum value among the maximum peak power of the motor, the maximum output power of the battery pack and the starting-up power of the fuel cell. In practical applications, the travelling gear state is particularly expressed as the D gear or the R gear.

In the step S302, the pure electric available power is the maximum peak power of the motor or the maximum output power of the battery pack or the starting-up power of the fuel cell, the maximum output power of the battery pack and the starting-up power of the fuel cell are relatively constant, and the maximum peak power of the motor is decided by the maximum output torque of the motor and the current rotational speed of the motor; in other words, the maximum peak power of the motor and the rotational speed of the motor are of a linear variation relation. Therefore, the pure electric available power that is determined in the state defined by the step S302 does not have step changing. When the available output power is displayed in a dashboard, that does not result in jumping of the available-power displaying pointer. On the contrary, between the state of the starting-up after parking in which the pure electric available power is 0, and the state in which the pure electric available power is the above-described smaller value, the pure electric available power increases with the rotational speed of the motor, which presents a process of smooth changing, thereby bringing the user an excellent visual feeling.

The present embodiment does not only solve the problem of the existing mode of determining the pure electric available power of fuel cell vehicles that complicated logical operations are required and the calculation result has a high deviation, but also solves the problem of the existing mode of determining the available power of battery packs causing the available-power displaying pointer of the dashboard jumps, which brings an adverse visual feeling of the user.

Figure 2:
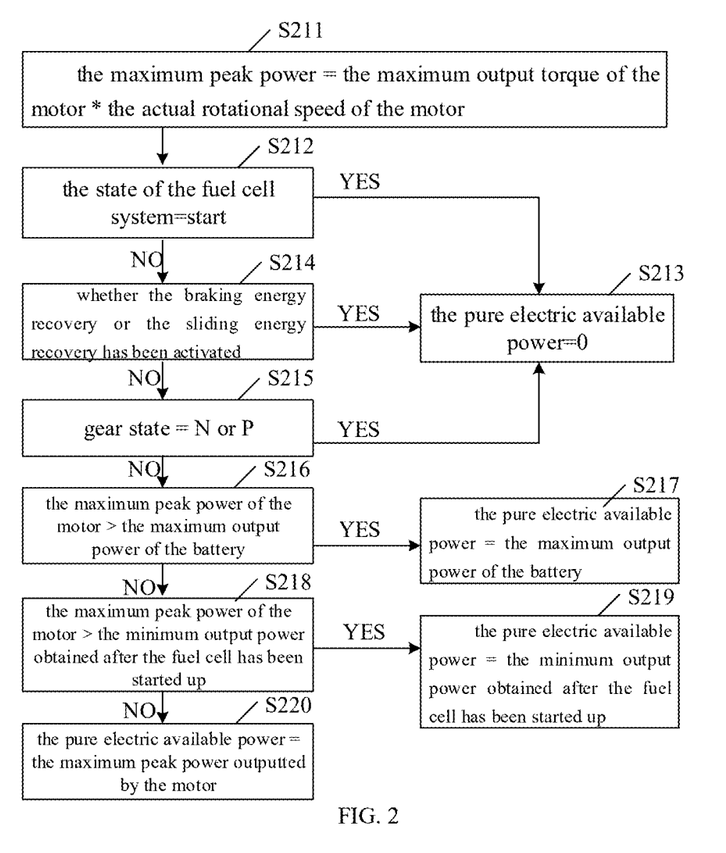
FIG. 2 is a flow chart of the implementation of the method for determining a pure electric available power according to an embodiment of the present disclosure.

In practical applications, referring to FIG. 2, FIG. 2 shows a flow chart of the implementation of the method for determining a pure electric available power according to an embodiment of the present disclosure.

As shown in FIG. 2, the process includes, in the step S211, firstly, by using the maximum output torque of the motor and the actual rotational speed of the motor, determining the maximum peak power outputted by the motor, and subsequently executing the step S212;

in the step S212, determining the on-off state of the fuel cell system, if the fuel cell is in the on-state, then executing the step S213, and if the fuel cell is in the off-state, then executing the step S214;

in the step S213, determining the pure electric available power to be 0;

in the step S214, determining whether the braking energy recovery or the sliding energy recovery has been activated, i.e., determining whether the energy-recovery function has been started up, if the energy recovery power is in the on-state, then executing the step S213, and if the energy recovery power is not started up, then executing the step S215;

in the step S215, determining the gear state of the vehicle, and if the gear state is a non-travelling gear such as the N gear or the P gear, then executing the step S213, or else executing the step S216;

in the step S216, determining whether the maximum peak power outputted by the motor is greater than the maximum output power of the battery, if the maximum peak power outputted by the motor is greater than the maximum output power of the battery, then executing the step S217, and determining the pure electric available power to be the maximum output power of the battery, and if the maximum peak power outputted by the motor is not greater than the maximum output power of the battery, then executing the step S218; and in the step S218, determining whether the maximum peak power outputted by the motor is greater than the minimum output power obtained after the fuel cell has been started up, i.e., determining whether the maximum peak power outputted by the motor is greater than the starting-up power of the fuel cell, if the maximum peak power outputted by the motor is greater than the starting-up power of the fuel cell, then executing the step S219, and determining the pure electric available power to be the minimum output power obtained after the fuel cell has been started up, and if the maximum peak power outputted by the motor is not greater than the starting-up power of the fuel cell, then executing the step S220, and determining the pure electric available power to be the maximum peak power outputted by the motor.

Figure 3:
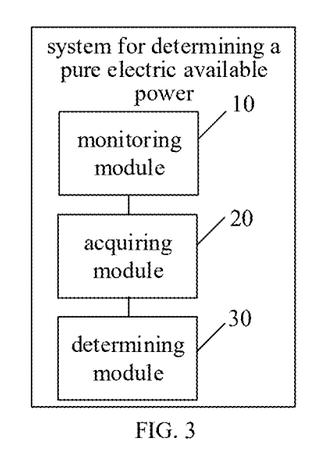
FIG. 3 is a schematic structural diagram of the system for determining a pure electric available power according to an embodiment of the present disclosure.

Another object of the present disclosure is to provide a system for determining a pure electric available power. The system is applied to a fuel cell vehicle, the vehicle further includes a battery pack and a motor, and the fuel cell and the battery pack are electrically connected to the motor. Referring to FIG. 3, FIG. 3 shows a schematic structural diagram of the system for determining a pure electric available power according to an embodiment of the present disclosure. The system includes:

a monitoring module 10 configured for monitoring a current travelling state of the vehicle and a current on-off state of the fuel cell;

an acquiring module 20 configured for acquiring a maximum peak power outputted by the motor, a maximum output power of the battery pack and a starting-up power of the fuel cell; and a determining module 30 configured for, according to the current travelling state, the current on-off state of the fuel cell, the maximum peak power, the maximum output power and the starting-up power, determining the pure electric available power.

The system according to the embodiments of the present disclosure, by using the monitoring module 10, monitors the current travelling state of the vehicle and the current on-off state of the fuel cell, and, by using the acquiring module 20, acquires the maximum peak power outputted by the motor, the maximum output power of the battery pack and the starting-up power of the fuel cell; and, subsequently, by using the determining module 30, according to the current travelling state, the current on-off state of the fuel cell, the maximum peak power, the maximum output power and the starting-up power, determines the pure electric available power. The pure electric available power may be quickly determined by using merely the travelling state of the vehicle, the on-off state of the fuel cell, the maximum peak power of the motor, the maximum output power of the battery pack and the starting-up power of the fuel cell, without complicated logical operation, and the operation states of the vehicle, the fuel cell system, the motor and the battery pack are taken into consideration simultaneously, whereby the determined pure electric available power is closer to the actual available power.

Optionally, in the system for determining a pure electric available power, the starting-up power refers to a minimum output power of the fuel cell when driving the motor by using the fuel cell has a higher efficiency than an efficiency of driving the motor by using the battery pack.

Optionally, in the system for determining a pure electric available power, the current travelling state includes a current gear state of the vehicle and a current on-off state of an energy-recovery function.

Optionally, in the system for determining a pure electric available power, the determining module 30 includes:
  a first determining unit configured for, when the current gear state of the vehicle is a non-travelling gear state, and/or the energy-recovery function is in an on-state, and/or the fuel cell is in an on-state, determining the pure electric available power to be 0; and
  a second determining unit configured for, when the current gear state of the vehicle is a travelling gear state, the energy-recovery function is in an off-state, and the fuel cell is in an off-state, then according to a smallest value among the maximum peak power, the maximum output power and the starting-up power, determining the pure electric available power.

Optionally, in the system for determining a pure electric available power, the acquiring module 20 includes:
  an acquiring unit configured for acquiring a maximum output torque of the motor and a current rotational speed of the motor; and
  a determining unit configured for, according to the maximum output torque and the current rotational speed, determining the maximum peak power.

Yet another object of the present disclosure is to provide a vehicle, the vehicle including a fuel cell, a battery pack and a motor, the fuel cell and the battery pack being electrically connected to the motor, wherein the vehicle further includes the system for determining a pure electric available power stated above.

The system for determining a pure electric available power and the vehicle have the same advantages as those of the above method for determining a pure electric available power over the prior art, which is not discussed herein further.

In conclusion, in the method and system for determining a pure electric available power and the vehicle according to the present disclosure, the current travelling state of the vehicle and the current on-off state of the fuel cell are monitored, and the maximum peak power outputted by the motor, the maximum output power of the battery pack and the starting-up power of the fuel cell are acquired; and, subsequently, according to the current travelling state, the current on-off state of the fuel cell, the maximum peak power, the maximum output power and the starting-up power, the pure electric available power is determined. The pure electric available power may be quickly determined by using merely the travelling state of the vehicle, the on-off state of the fuel cell, the maximum peak power of the motor, the maximum output power of the battery pack and the starting-up power of the fuel cell, without complicated logical operation, and the operation states of the vehicle, the fuel cell system, the motor and the battery pack are taken into consideration at a same time, whereby the determined pure electric available power is closer to the actual available power, which solves the problems of the existing mode of determining the pure electric available power of fuel cell vehicles that complicated logical operations are required and the calculation result has a high deviation and that the available-power displaying pointer in the dashboard easily jumps.

A person skilled in the art can clearly understand that, in order for the convenience and concision of the description, the particular working processes of the above-described systems, devices and units may refer to the corresponding processes according to the above-described process embodiments, and are not discussed herein further.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 4:
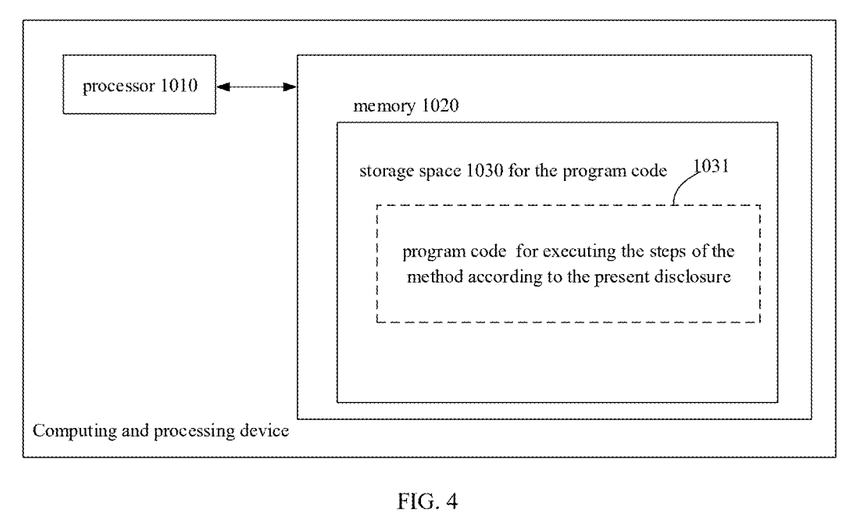
FIG. 4 schematically shows a block diagram of a computing and processing device for executing the method according to the present disclosure.
Figure 5:
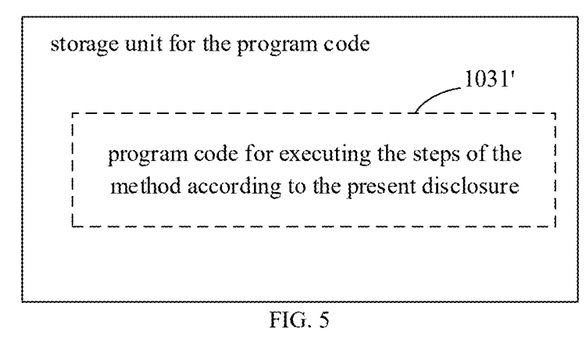
FIG. 5 schematically shows a storage unit for maintaining or carrying a program code for implementing the method according to the present disclosure.

For example, FIG. 4 shows a computing and processing device that can implement the method according to the present disclosure. The computing and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 5. The storage unit may have storage segments or storage spaces with similar arrangement to the memory 1020 of the computing and processing device in FIG. 4. The program codes may, for example, be compressed in a suitable form. Generally, the storage unit contains a computer-readable code 1031', which can be read by a processor like 1010. When those codes are executed by the computing and processing device, the codes cause the computing and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The above are merely particular embodiments of the present disclosure, and the protection scope of the present disclosure is not limited thereto. All of the variations or substitutions that a person skilled in the art can easily envisage within the technical scope disclosed by the present disclosure should fall within the protection scope of the present disclosure. Therefore, the protection scope of the present disclosure should be subject to the protection scope of the claims.

The invention claimed is:

1. A method for determining a pure electric available power, the method being applied to a vehicle comprising a fuel cell, the vehicle further comprising a battery pack and a motor, the fuel cell and the battery pack being electrically connected to the motor, wherein the method comprises:
    by one or more processors, monitoring a current travelling state of the vehicle and a current on-off state of the fuel cell;
    by one or more processors, acquiring a maximum peak power outputted by the motor, a maximum output power of the battery pack and a starting-up power of the fuel cell, wherein the starting-up power refers to a minimum output power of the fuel cell when driving the motor by using the fuel cell has a higher efficiency than an efficiency of driving the motor by using the battery pack, and the current travelling state comprises a current gear state of the vehicle and a current on-off state of an energy-recovery function; and
    by one or more processors, according to the current travelling state, the current on-off state of the fuel cell, the maximum peak power, the maximum output power and the starting-up power, determining the pure electric available power and displaying the pure electric available power in a dashboard;
    the step of, according to the current travelling state, the current on-off state of the fuel cell, the maximum peak power, the maximum output power and the starting-up power, determining the pure electric available power comprises:
    when the current gear state of the vehicle is a non-travelling gear state, and/or the energy-recovery function is in an on-state, and/or the fuel cell is in an on-state, determining the pure electric available power to be 0; and
    when the current gear state of the vehicle is a travelling gear state, the energy-recovery function is in an off-state, and the fuel cell is in an off-state, according to a smallest value among the maximum peak power, the maximum output power and the starting-up power, determining the pure electric available power.

2. The method for determining the pure electric available power according to claim 1, wherein the step of acquiring the maximum peak power outputted by the motor comprises:
    acquiring a maximum output torque of the motor and a current rotational speed of the motor; and
    according to the maximum output torque and the current rotational speed, determining the maximum peak power.

3. A computing and processing device, wherein the computing and processing device comprises:
    a memory storing a computer-readable code; and
    one or more processors, wherein when the computer-readable code is executed by the one or more processors, the computing and processing device executes the method for determining the pure electric available power according to claim 1.

4. The device according to claim 3, wherein the step of acquiring the maximum peak power outputted by the motor comprises:
    acquiring a maximum output torque of the motor and a current rotational speed of the motor; and
    according to the maximum output torque and the current rotational speed, determining the maximum peak power.

5. A non-transitory computer-readable medium, wherein the computer-readable medium stores a computer-readable code, and when the computer-readable code is executed, the method for determining the pure electric available power according to claim 1 is performed.

6. A system for determining a pure electric available power, the system being applied to a vehicle comprising a fuel cell, the vehicle further comprising a battery pack and a motor, the fuel cell and the battery pack being electrically connected to the motor,
   one or more processors and a storage apparatus; and
   the storage apparatus stores a computer program which, when executed by the processor, perform the operations comprising:
   a monitoring module configured for monitoring a current travelling state of the vehicle and a current on-off state of the fuel cell;
   acquiring a maximum peak power outputted by the motor, a maximum output power of the battery pack and a starting-up power of the fuel cell, wherein the starting-up power refers to a minimum output power of the fuel cell when driving the motor by using the fuel cell has a higher efficiency than an efficiency of driving the motor by using the battery pack, and the current travelling state comprises a current gear state of the vehicle and a current on-off state of an energy-recovery function; and
   according to the current travelling state, the current on-off state of the fuel cell, the maximum peak power, the maximum output power and the starting-up power, determining the pure electric available power and displaying the pure electric available power in a dashboard;
   the step of, according to the current travelling state, the current on-off state of the fuel cell, the maximum peak power, the maximum output power and the starting-up power, determining the pure electric available power comprises:
   when the current gear state of the vehicle is a non-travelling gear state, and/or the energy-recovery function is in an on-state, and/or the fuel cell is in an on-state, determining the pure electric available power to be 0; and
   when the current gear state of the vehicle is a travelling gear state, the energy-recovery function is in an off-state, and the fuel cell is in an off-state, according to a smallest value among the maximum peak power, the maximum output power and the starting-up power, determining the pure electric available power.

7. The system for determining the pure electric available power according to claim 6, wherein the operation of acquiring the maximum peak power outputted by the motor, the maximum output power of the battery pack and the starting-up power of the fuel cell comprises:
   acquiring a maximum output torque of the motor and a current rotational speed of the motor; and
   according to the maximum output torque and the current rotational speed, determining the maximum peak power.

8. A vehicle, the vehicle comprising a fuel cell, a battery pack and a motor, the fuel cell and the battery pack being electrically connected to the motor, wherein the vehicle further comprises the system for determining the pure electric available power according to claim 6.

9. The vehicle according to claim 8, wherein the operation of acquiring the maximum peak power outputted by the motor, the maximum output power of the battery pack and the starting-up power of the fuel cell comprises:
   acquiring a maximum output torque of the motor and a current rotational speed of the motor; and
   according to the maximum output torque and the current rotational speed, determining the maximum peak power.

\* \* \* \* \*